BAILEY & RICH.
Smut Machine.
No. 2,172.
Patented July 16, 1841.
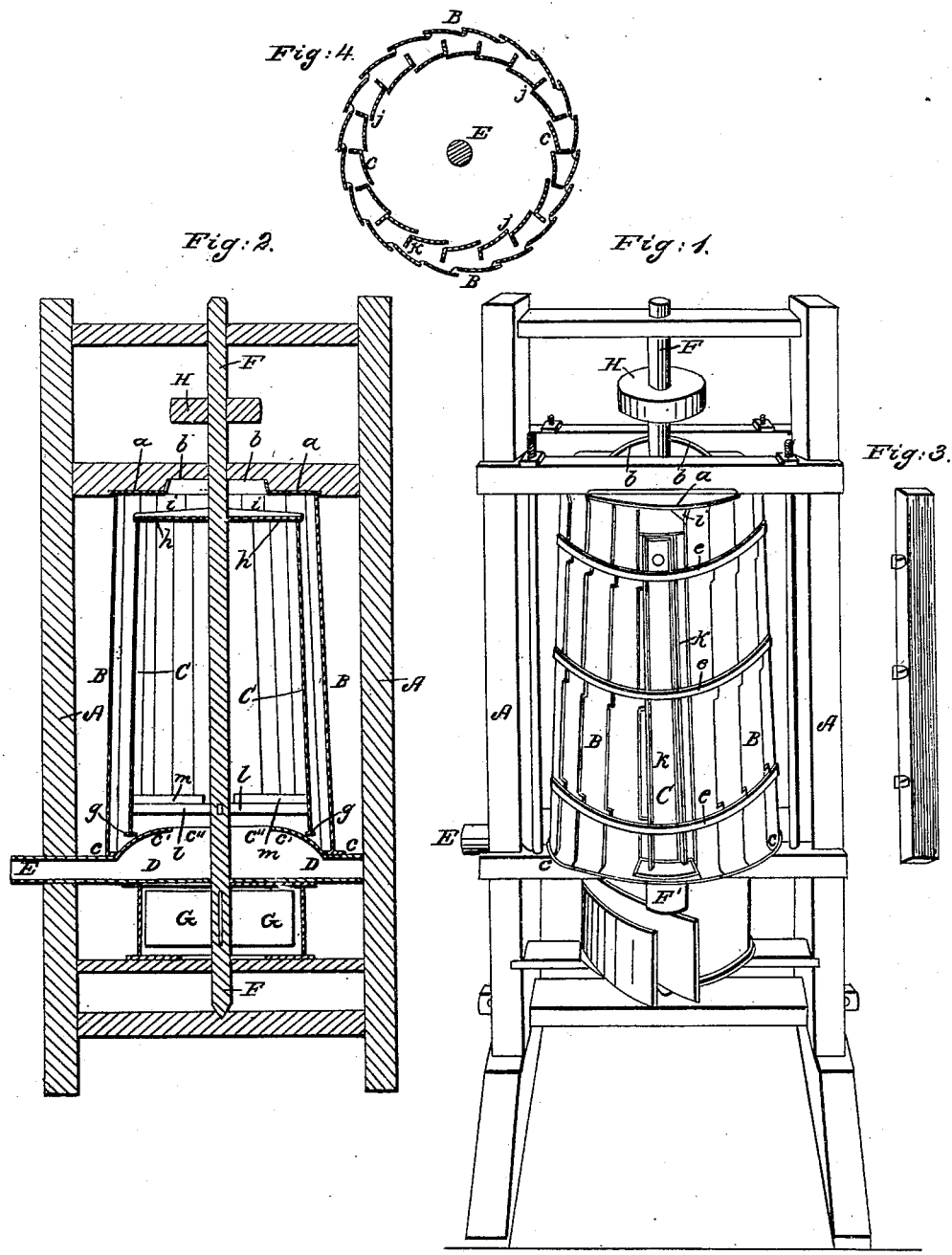

UNITED STATES PATENT OFFICE.

THOS. R. BAILEY, OF WEYBRIDGE, AND EZRA RICH, OF SHOREHAM, VERMONT.

CONSTRUCTION OF SMUT-MACHINES.

Specification of Letters Patent No. 2,172, dated July 16, 1841.

*To all whom it may concern:*

Be it known that we, THOMAS R. BAILEY, of Weybridge, and EZRA RICH, of Shoreham, in the county of Addison and State of Vermont, have invented certain Improvements in Machines for Cleaning Wheat and other Small Grain, usually denominated "Smut-Machines;" and we do hereby declare that the following is a full and exact description thereof.

Our machine consists of two hollow, conical frustums, or cylinders, of cast-iron, the outermost of which is stationary, while that within it is, when used for cleaning grain, to be made to revolve with great rapidity; each of these frustums, or cylinders, is to consist of strips, or staves, of cast-iron, which are to be confined in place by means of suitable grooves, or depressions, cast on the heads, or rims, by which the ends of the staves of each frustum, or cylinder, are to be received and held together. Between each of the staves, or strips, which form the peripheries of each of the cones, or cylinders, there is to be a slot, or opening, extending along its whole length for the passage of air, in a manner, and for a purpose, to be presently described.

In the accompanying drawing Figure 1, is a perspective view of the whole machine; Fig. 2, a vertical section through the axis thereof; Fig. 3, one of the staves of the exterior frustum, or cylinder, representing the inner side thereof; and Fig. 4, is a horizontal section through the two cones, or cylinders, showing their form, and the manner in which they are arranged and combined together.

In each of these figures, the same letters of reference are employed to designate like parts.

A, A, is the frame of the machine.

B, B, is the outer, or stationary, case. The staves of which this is composed, as well as those of the interior body, we make about three inches wide and the fourth of an inch thick.

*a, a,* is the upper rim, or end, of the stationary case, which is left open at *b, b,* for the feeding in of the grain; *c, c,* is its bottom, or lower rim, which is curved up from the outer edge, as shown at *c′, c′,* to cause the grain to be kept in the space between the two frustums, or cylinders. These heads, or rims, are each cast with depressions, or grooves, to receive the ends of the staves; these grooves being arranged in the same way with the staves, as seen in Fig. 4; and when the heads, or rims, are confined together by rods, or otherwise, the ends of the staves will be thereby firmly held in place. These staves do not overlap each other but have a space of about a sixteenth of an inch, between them; which space is to allow of the escape of dust and of other small particles, while it will not admit of the passing of the grain; their contiguous edges lie in the same radial line, as nearly as may be. The staves are kept apart by casting upon one edge of each of them, on the inner side thereof, three or more projecting pieces, to serve as bearings for the stave immediately behind it; these projections are seen at *d, d, d,* on the stave, Fig. 3, and also at the junctions of these staves in Fig. 4. Along the inside of each of these staves we make shallow grooves, say about a sixteenth of an inch deep, as shown at *f, f, f* to aid in the operation of beating. *e, e, e,* Fig. 1, are hoops which may be made of stout wire, or of narrow strips of iron, the former being preferred as offering less obstruction; these hoops serve to bind the staves down on the projecting pieces, and to preserve the regularity of the openings between them. This outer frustum, or cylinder, we have made about twenty-six inches long, and twenty inches in diameter.

In Fig. 1, two of the staves are left out in the drawing for the purpose of showing a part of the interior frustum, or cylinder, C, C. The staves of this interior cylinder are cast in the form represented at C, C, in the sectional drawing, Fig. 4; and, like the staves in Fig. 1, their ends are received in a cast-iron head, and rim, having grooves adapted to them; *g, g,* Fig. 1, is the rim which receives their lower ends, and *h, h,* the head which receives their upper ends; the head *h, h,* is made close as the grain fed into the machine falls upon it, and it should be furnished with radiating wings *i, i,* to throw the grain toward the periphery as it falls in, and to aid in creating a wind. The portion of the staves which may be said to constitute the periphery of the interior frustum, or cylinder, overlap each other as at *j, j, j,* Fig. 4, to the distance of about a sixteenth of an inch; and there is a space between them, of about a fourth of an inch, for the passage of wind, which distance is preserved by casting three or more projecting pieces of that height on one edge of each stave; we, usually, also, surround these staves with three flat hoops, to bind them together, and counteract the centrifugal force; these hoops bear upon the outer edges of the radiating beaters $k$, $k$, $k$, which rise from the curved part of the staves, extending their whole length, and serving at the same time as vanes to create a strong wind, and, as beaters, to force the grain against the outer staves, and more especially, by their tangential action upon it, against the inner edges of said staves; these beaters we make about half an inch wide. The inner frustum, or cylinder, we have made about twenty-four inches long, and eighteen inches in diameter.

In using this machine thus constructed, air is forcibly ejected from the inner cylinder through the openings between its staves, and passes out through the openings between the staves of the outer cylinder. This air we supply from without the apartment in which the grain cleaner is used, as that within it is rendered unfit for the purpose by the impurities escaping from the machine. Under the bottom plate, or rim, $c$, $c$, of the outer cylinder, there is a space D, D, for the admission of air, and into this enters a tube E, leading from any suitable place for supplying the required air. This air has a clear passage into the inner frustum, or cylinder, the rim $c$, $c$, being open at the middle as at $c''$, $c''$, and there being only the narrow rim $g$, $g$, at the lower end of C, C; to support this cone, or cylinder, at its lower end, cross bars $l$, $l$, $l$, extend from its shaft F, to its periphery; and to increase the force of the wind we place vanes $m$, $m$, on the upper sides of these cross pieces.

To discharge the grain, a tube F', extends down from the space between the two cones, or cylinders, and as said grain descends, it is operated upon, and the chaff and other light substances are blown away from it by the vanes G, G, of a fan wheel attached to the shaft F. The inner frustum, or cylinder, may be driven by means of a whirl H, or in any other convenient manner.

By the manner in which we arrange the staves that constitute the stationary frustum, or cylinder, the grain is forcibly struck against the edge of the stave immediately behind the opening; and the direction given to it, and to the wind created by the beaters, being tangential, is such as to render the operation most effective, and to cause the smut, and other impurities to be driven through said openings, with the wind, more freely and effectually than in any other known machine for the same purpose.

Having thus, fully described the manner in which we construct our machine for cleaning grain, and explained the operation thereof, what we claim as constituting our invention, and desire to secure by Letters Patent, is—

1. The arranging of the staves which constitute the outer case, or stationary frustum, or cylinder, so that they shall overlap each other to a small distance, and at the same time leaving a space between each contiguous stave for the passage of air, smut, and other impurities from the grain, while the grain itself is prevented from passing through.

2. We also claim the manner of constructing the inner revolving frustum, or cylinder, by forming the same of cast-iron staves, so combined as to overlap each other, and to leave a space of a fourth of an inch, more or less, between them, for the passage of air, to be supplied from without the apartment; the whole being arranged and combined together substantially in the manner herein set forth.

THOMAS R. BAILEY.
EZRA RICH.

Witnesses:
JOHN T. RICH,
WILLARD W. LOCK.